May 6, 1958   M. P. CORREIA   2,833,100
MOBILE HARVESTING AND PACKING APPARATUS
Filed June 15, 1954   12 Sheets-Sheet 1
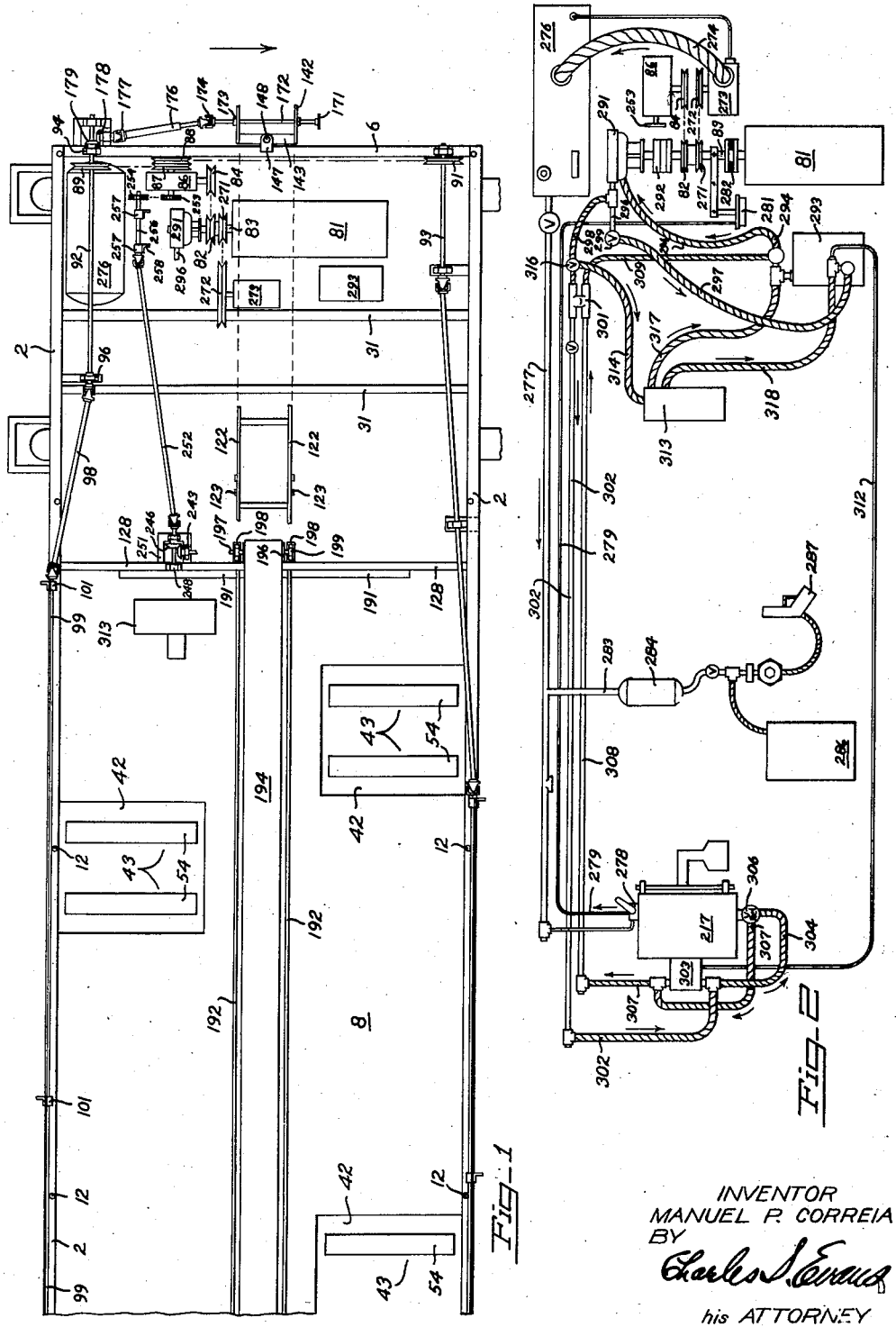
INVENTOR
MANUEL P. CORREIA
BY
*Charles S. Evans*
his ATTORNEY May 6, 1958   M. P. CORREIA   2,833,100
MOBILE HARVESTING AND PACKING APPARATUS
Filed June 15, 1954   12 Sheets-Sheet 2
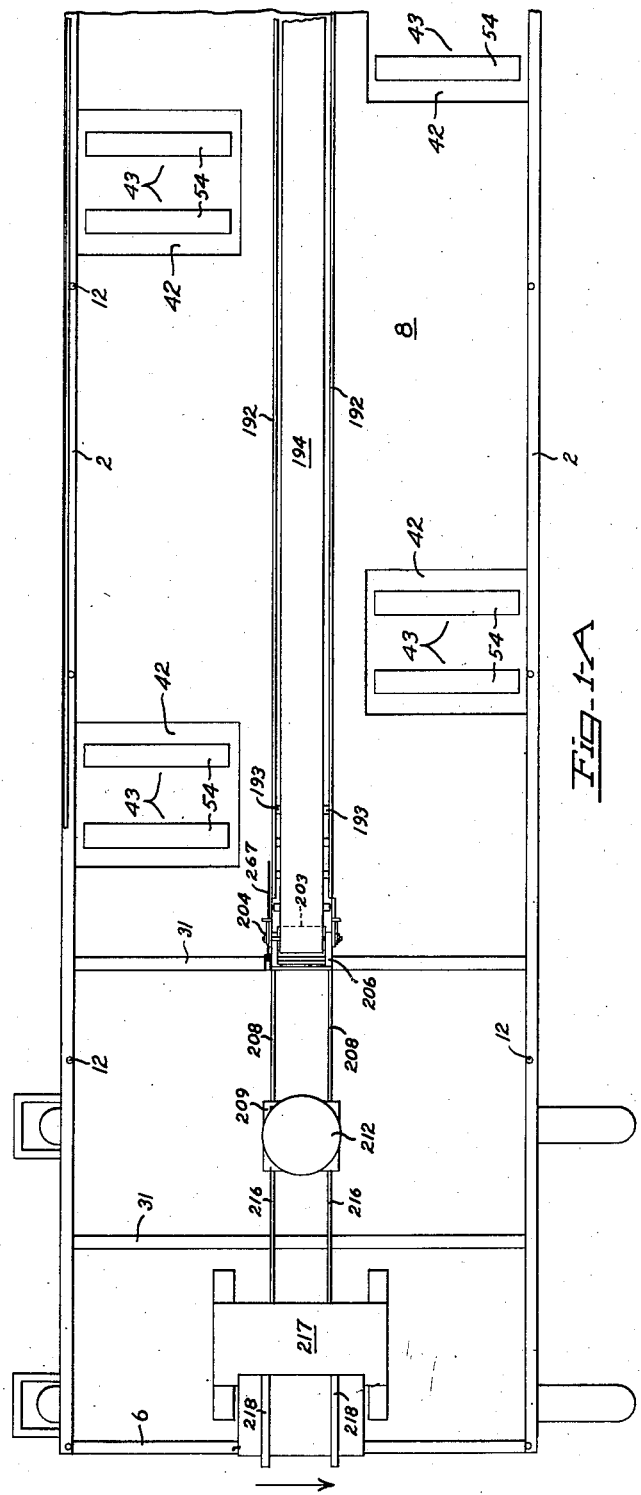
INVENTOR
MANUEL P. CORREIA
BY
Charles S. Evans
his   ATTORNEY May 6, 1958 M. P. CORREIA 2,833,100
MOBILE HARVESTING AND PACKING APPARATUS
Filed June 15, 1954 12 Sheets-Sheet 3
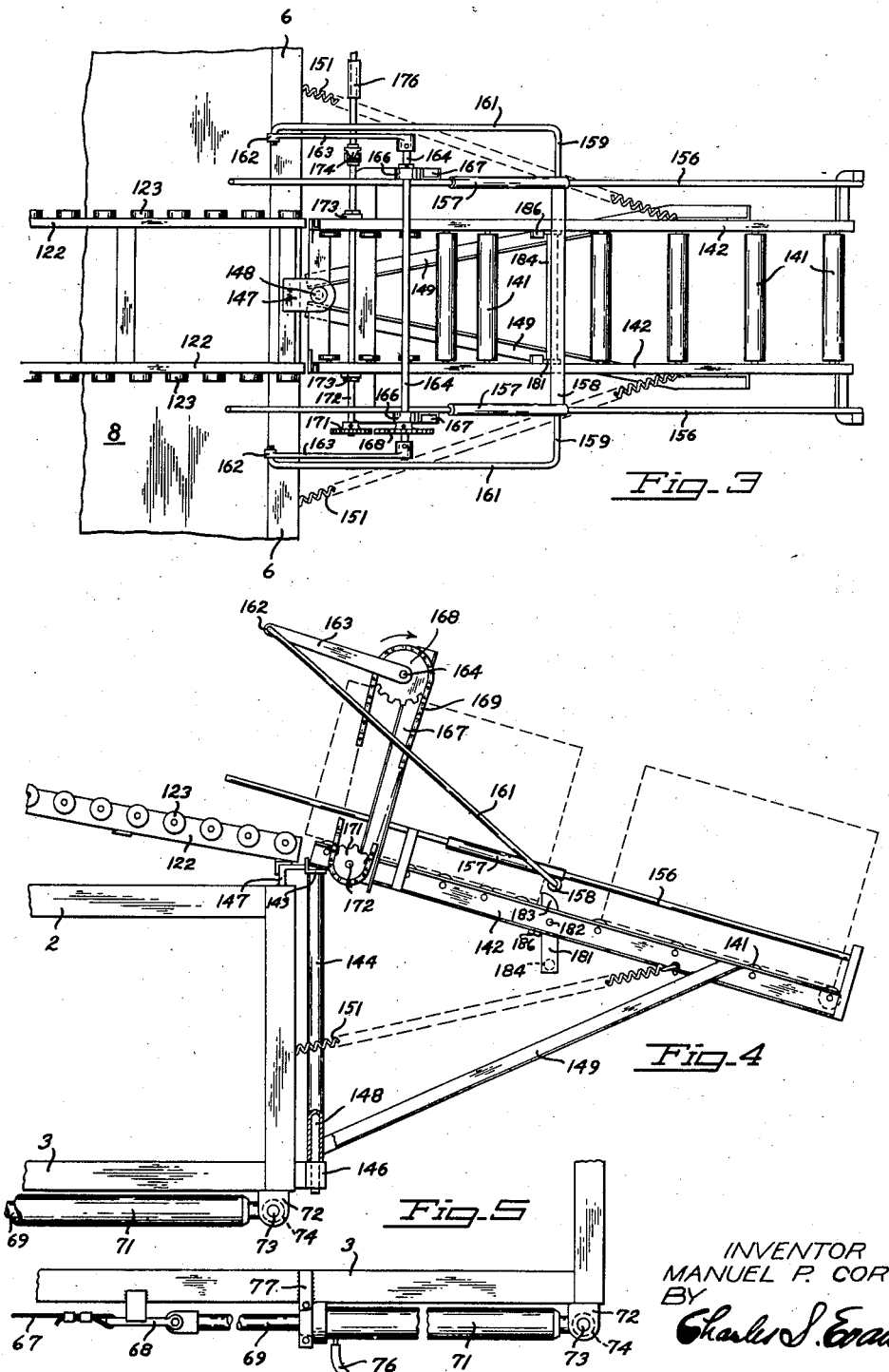
INVENTOR
MANUEL P. CORREIA
BY
Charles S. Evans
his ATTORNEY

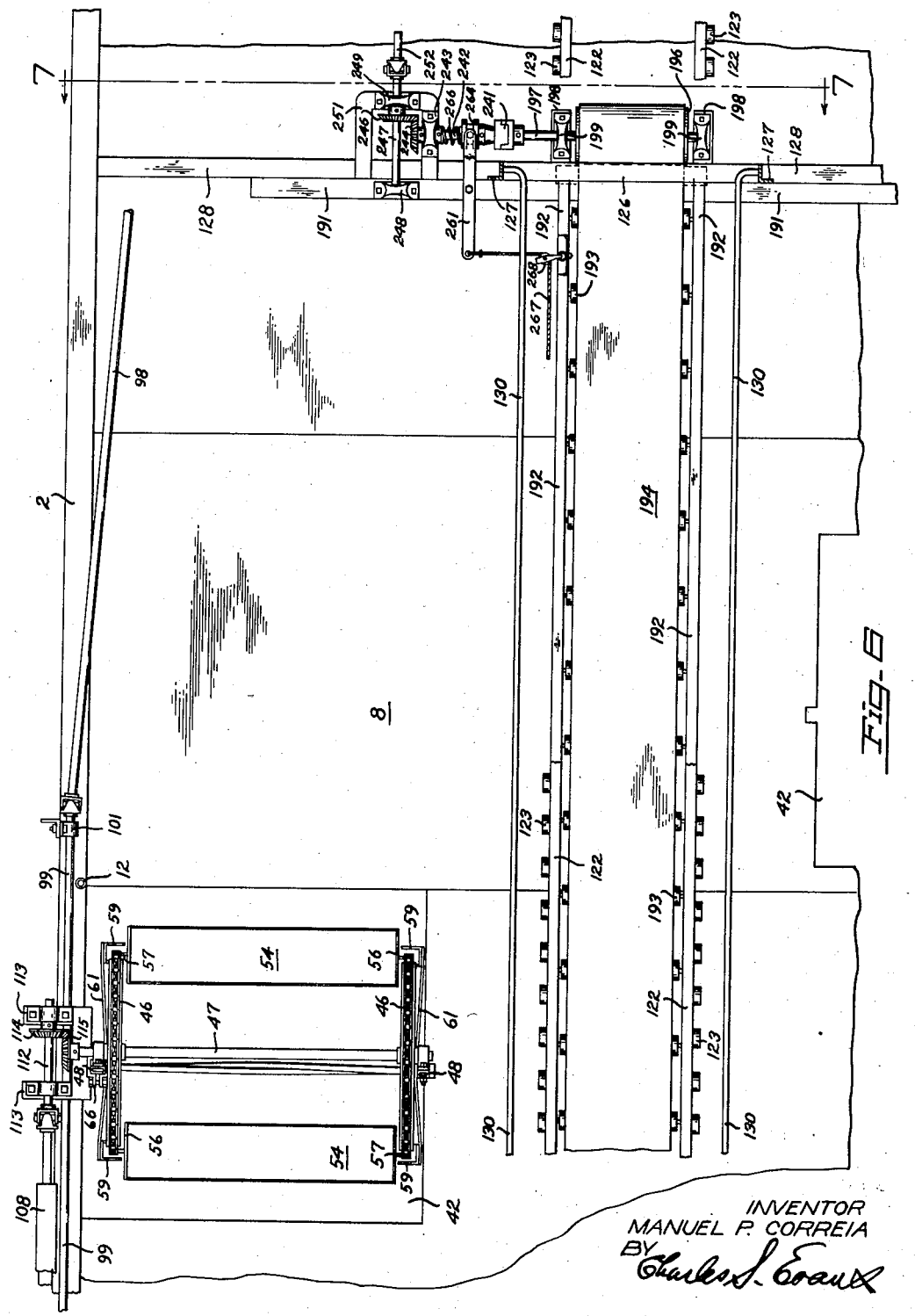

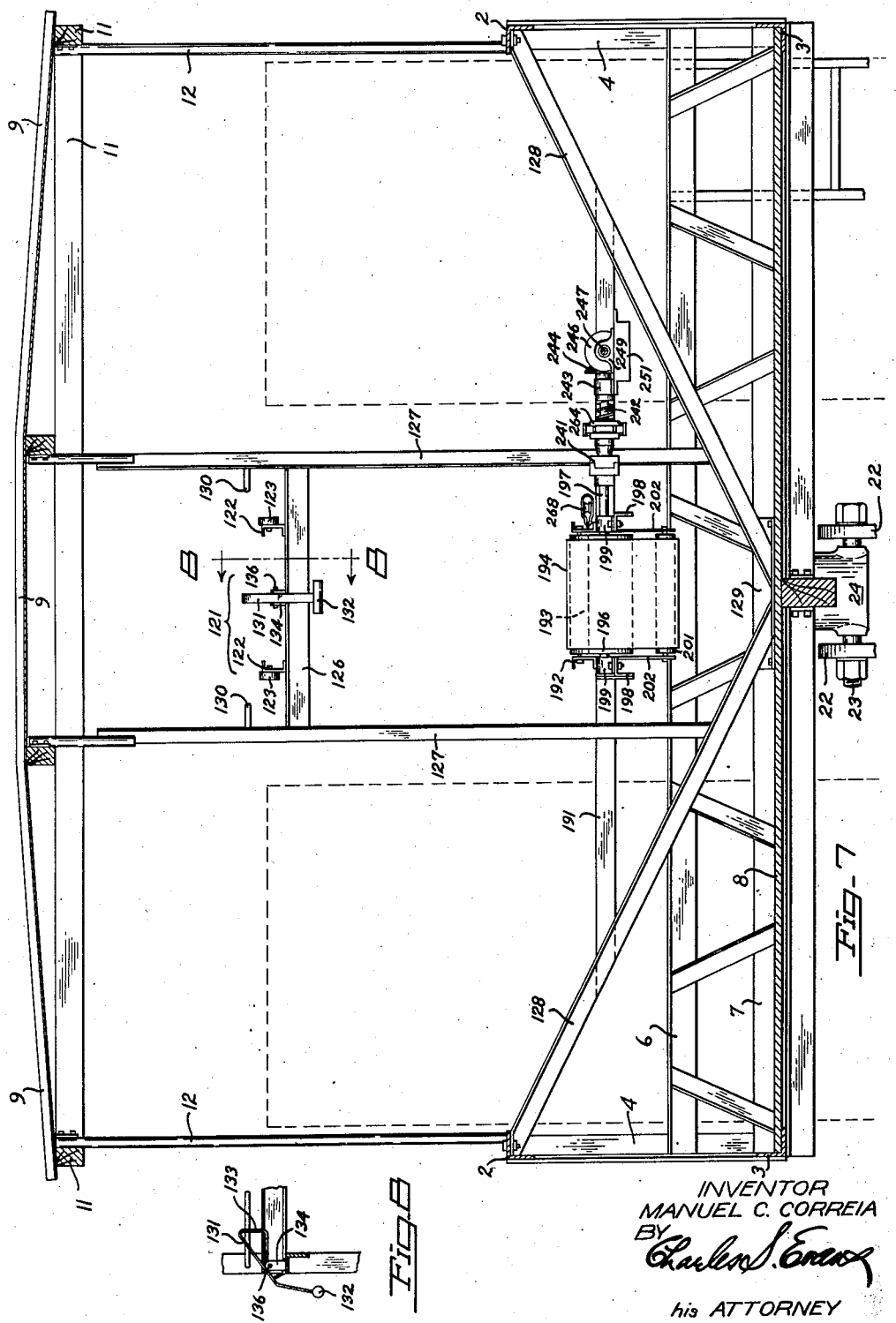

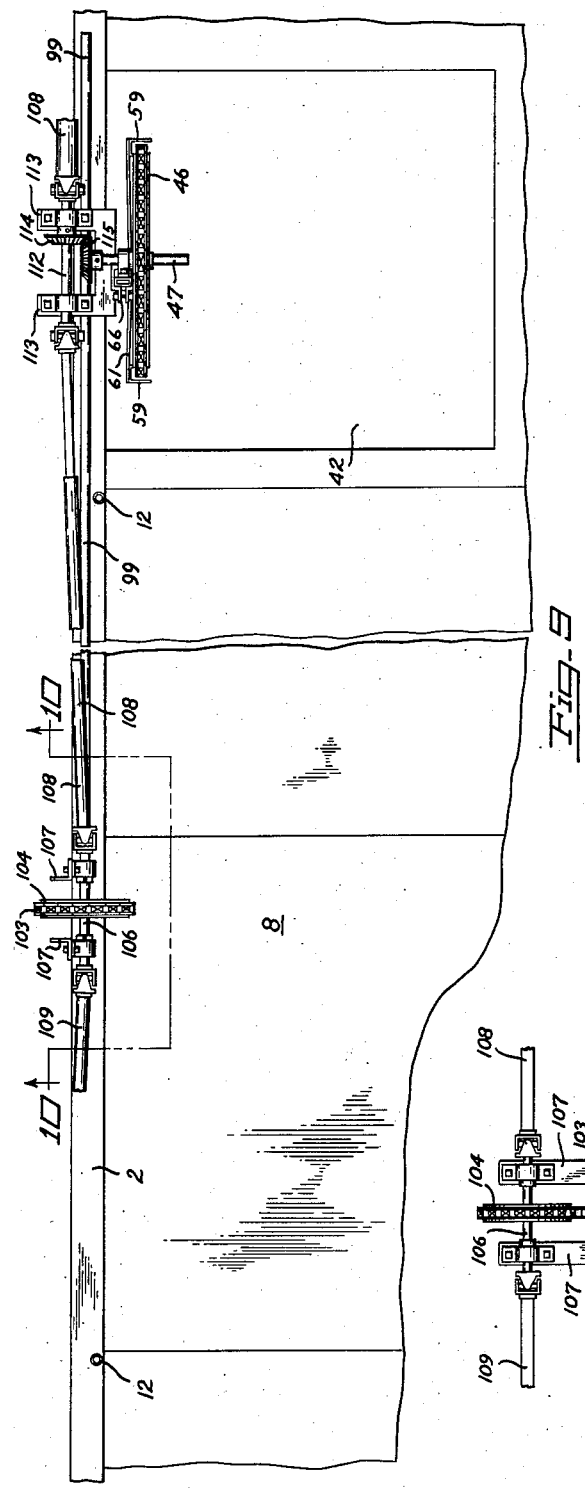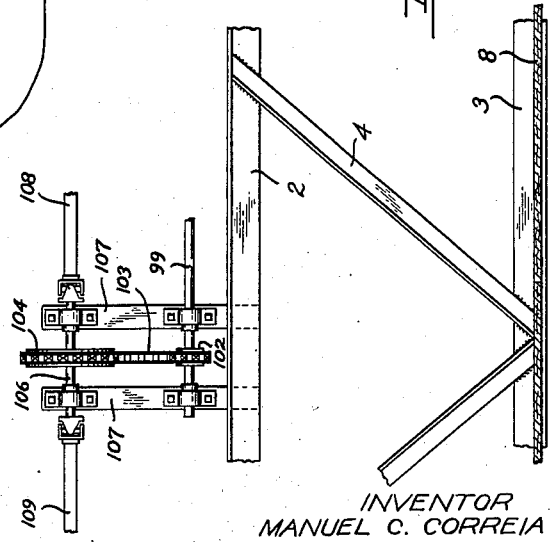

May 6, 1958     M. P. CORREIA     2,833,100

MOBILE HARVESTING AND PACKING APPARATUS

Filed June 15, 1954     12 Sheets-Sheet 7

INVENTOR
MANUEL P. CORREIA
BY
Charles J. Evans
his ATTORNEY

May 6, 1958 M. P. CORREIA 2,833,100
MOBILE HARVESTING AND PACKING APPARATUS
Filed June 15, 1954 12 Sheets-Sheet 8
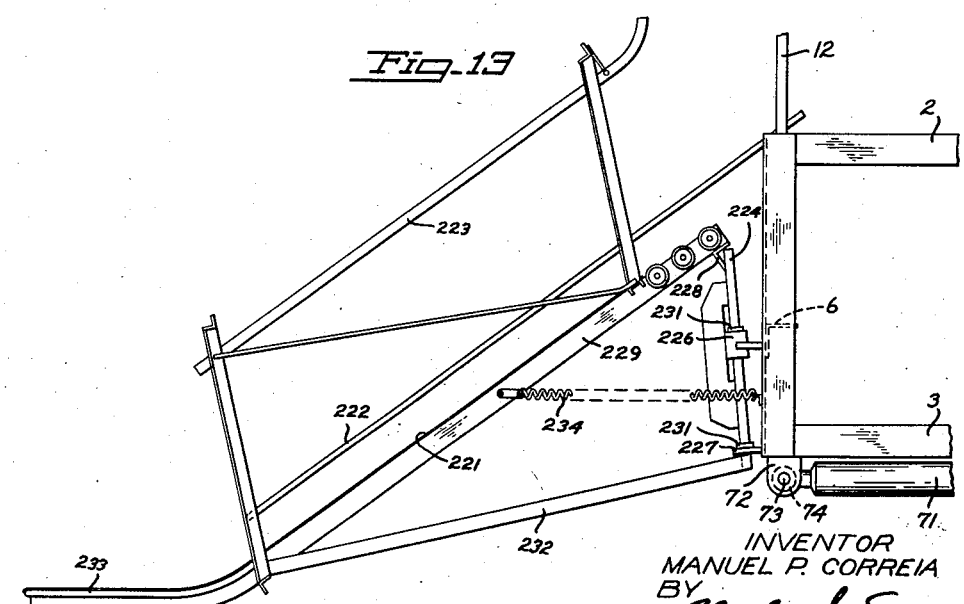
INVENTOR
MANUEL P. CORREIA
BY
Charles S. Evans
his ATTORNEY May 6, 1958   M. P. CORREIA   2,833,100
MOBILE HARVESTING AND PACKING APPARATUS
Filed June 15, 1954   12 Sheets-Sheet 9
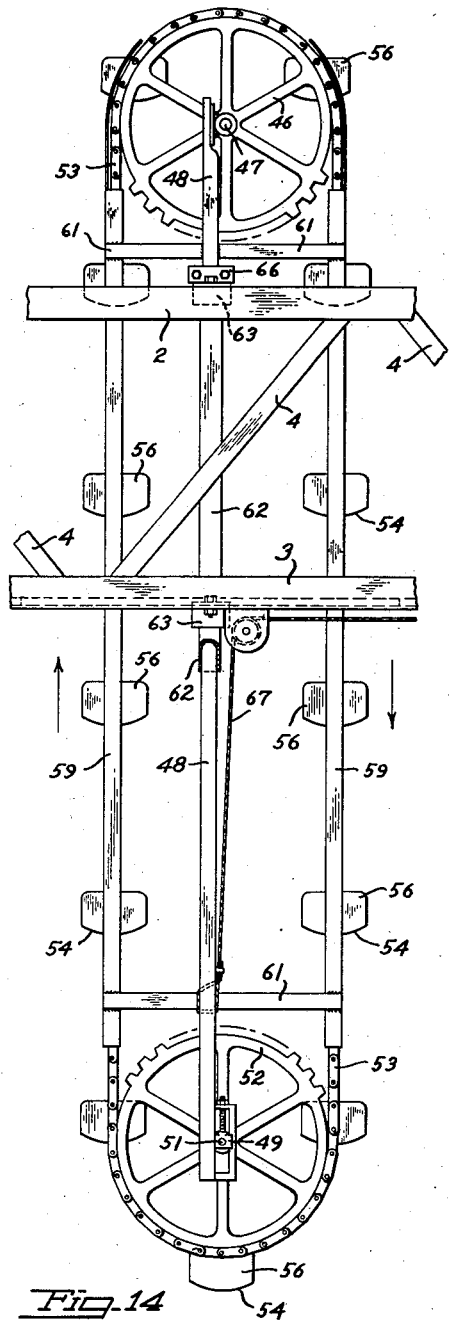
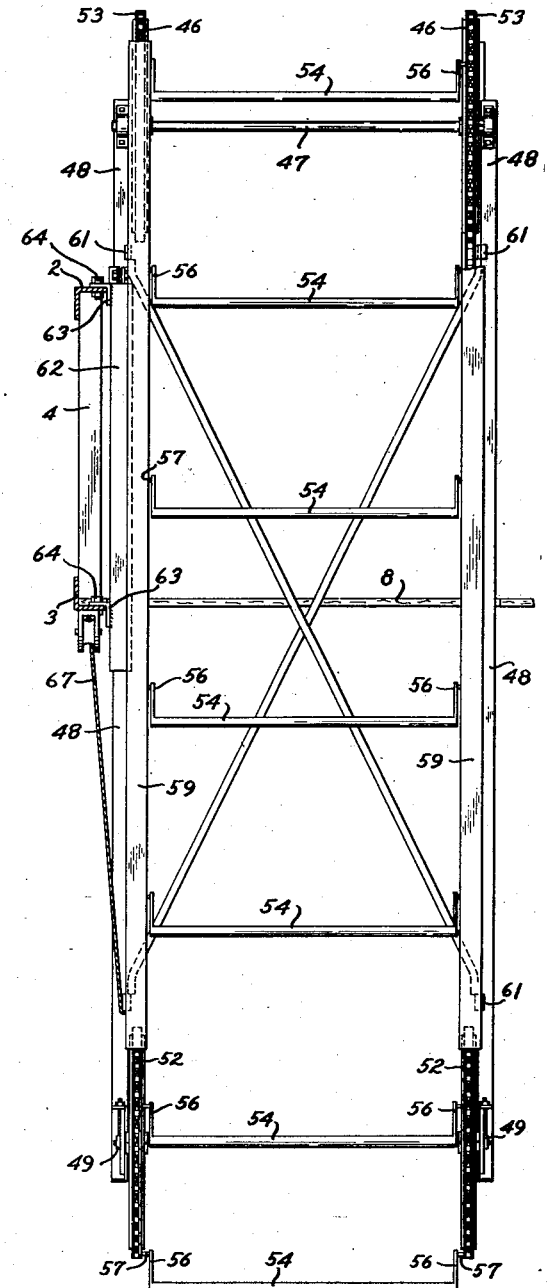
GROUND LEVEL
INVENTOR
MANUEL P. CORREIA
BY
Charles S. Evans
his ATTORNEY

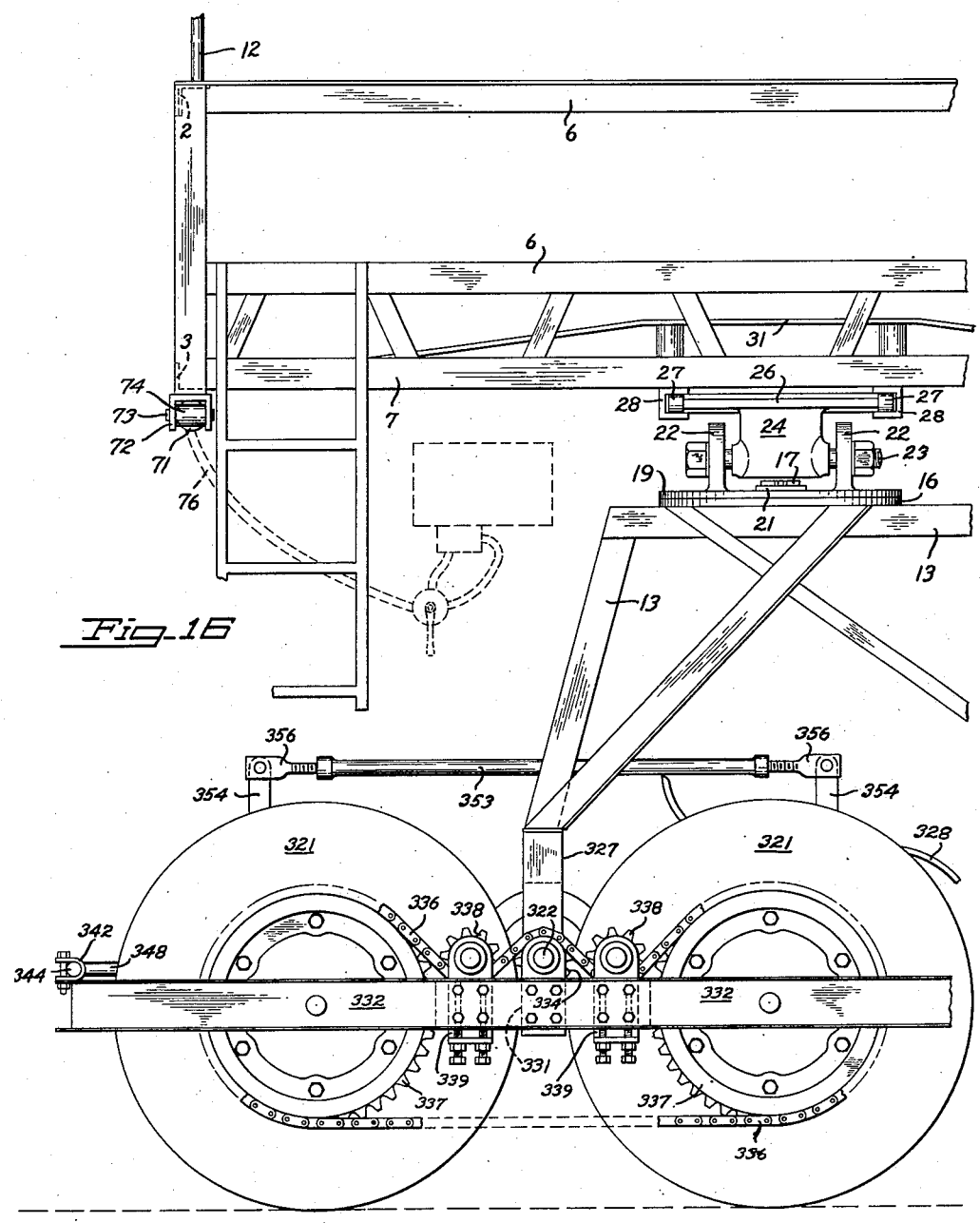

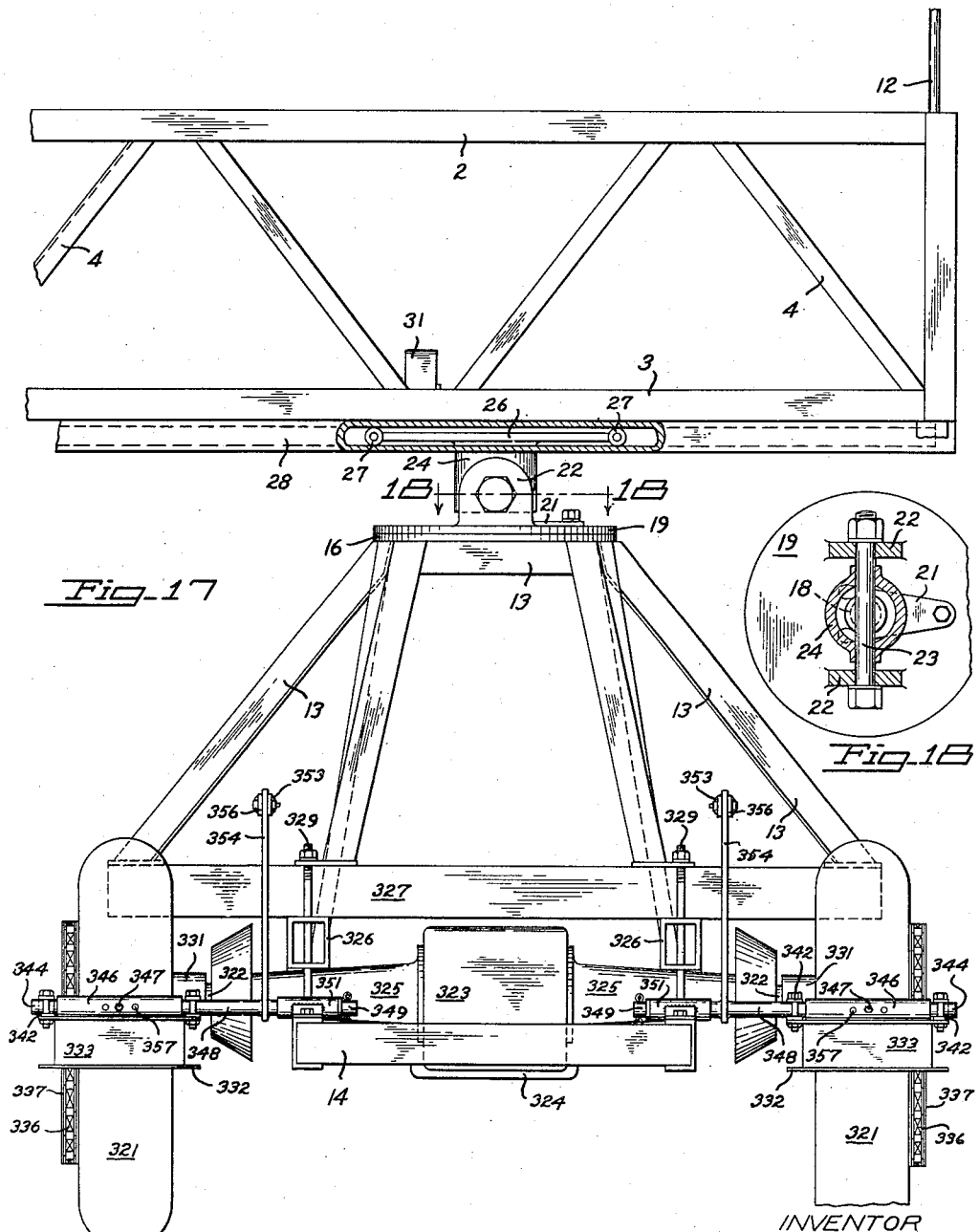

May 6, 1958 M. P. CORREIA 2,833,100
MOBILE HARVESTING AND PACKING APPARATUS
Filed June 15, 1954 12 Sheets-Sheet 12
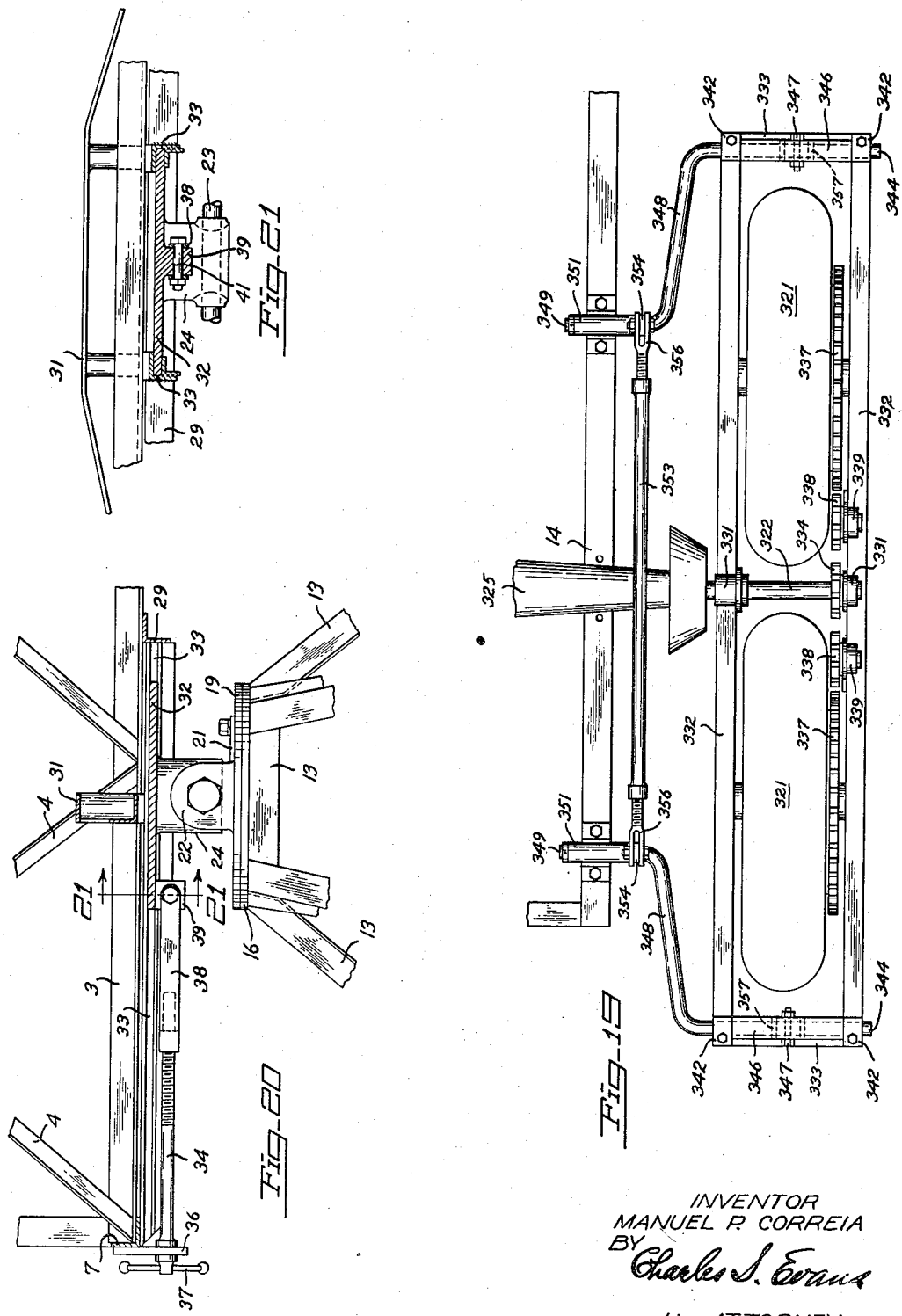
INVENTOR
MANUEL P. CORREIA
BY
*Charles S. Evans*
his ATTORNEY

United States Patent Office 2,833,100
Patented May 6, 1958

2,833,100

MOBILE HARVESTING AND PACKING APPARATUS

Manuel P. Correia, Santa Maria, Calif.

Application June 15, 1954, Serial No. 436,960

14 Claims. (Cl. 53—391)

My invention relates to crop handling machinery; and more particularly to a mobile machine which expedites conditioning and packing of row crops, particularly lettuce and cabbage.

One of the objects of my invention is the provision of a mobile machine which reduces to a minimum the time required to process lettuce.

Another object is the provision of a machine which is capable of movement down an extensive field of lettuce, receives the harvested crop from a multiplicity or rows, places the lettuce in position to be processed, provides means for crating the processed lettuce and discharges the crated lettuce for shipment to cold storage.

Another object is the provision of a mobile packing machine adapted for movement across a field to be harvested and in which is included its own motive power as well as means for handling the harvested crop in time with normal working speed of the field workers walking alongside the machine and feeding the harvested crop into the machine.

Still another object is the provision of a machine which is extremely maneuverable, both in its operation in the field and on the road.

A still further object is the provision of a mobile packing machine provided with its own motive power, conveniently a pair of spaced tractors, and capable of matching the forward speed of the machine to that of the walking worker.

Still another object is the provision of a machine of the general character described which is provided with elevator units suspended from a bridge frame in position to receive harvested lettuce heads without the lettuce heads touching the ground.

Still a further object is the provision in such a machine of a bridge frame pivotally adjustable on the spaced tractors to compensate for unevenness of terrain.

Still another object is the provision in such a machine of elevator units adjustable in height with relation to the ground or crop level.

Still a further object is the provision of a packing machine in which the lateral spacing of the tractors is adjustable to permit adaptability of the machine to variations in the spacing of crop rows.

Still another object of my invention is the provision of a packing machine in which the tractor supporting each end of the bridge frame may be turned completely around or travel in any direction without changing the relative position of the bridge frame to the ground.

Other objects of the invention, together with the foregoing, will be set forth in the following description of the preferred embodiment of my invention which is illustrated in the accompanying drawings. It is to be understood that I do not limit myself to the showing made by the said description and drawings, as I may adopt variations of my preferred form within the scope of my invention as set forth in the appended claims.

Referring to the drawings:

Figs. 1 and 1A are diagrammatic plan views which are substantially continuations of each other and which show the overall arrangement of parts and equipment. Both views are drawn to a greatly reduced scale; and in each figure a portion is broken away to reduce its length.

Fig. 2 is a diagrammatic view showing the hydraulic and compressed air control lines and mechanisms.

Fig. 3 is a plan view of the power driven, empty crate-loading means on one end of the bridge frame.

Fig. 4 is a side elevation of the crate loading means. In both views only a portion of the bridge frame is shown.

Fig. 5 is a fragmentary view in elevation, showing the hydraulic means which controls raising and lowering of the elevator units.

Fig. 6 is a fragmentary view in plan, showing the drive mechanism for the main horizontal belt conveyor and for one of the elevators.

Figure 11:
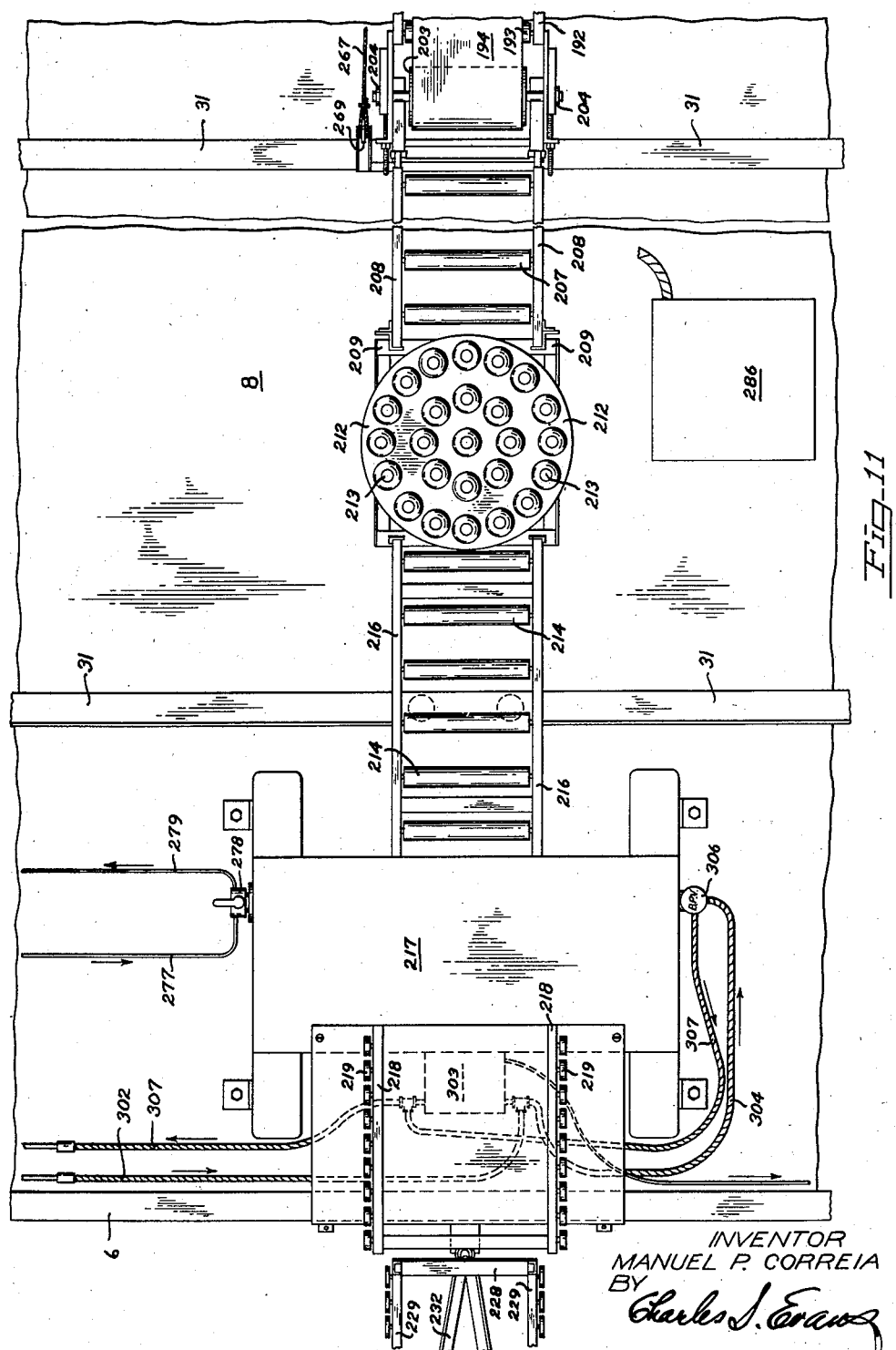

Fig. 7 is a vertical sectional view taken in the plane indicated by the line 7—7 of Fig. 6. The position of elevators is indicated by dash lines. The view shows the relationship of the two horizontal conveyors, and indicates the means for supporting the main frame on the spaced tractors.

Fig. 8 is a vertical sectional view taken in the plane indicated by the line 8—8 of Fig. 7. The view shows the counterbalanced means for retaining empty crates on the crate conveyor.

Fig. 9 is a fragmentary view in plan, showing the drive for the elevator unit next succeeding that shown in Fig. 6. Both elevators are on the same side of the machine. Also shown is the means which distributes power from the main drive shaft to the elevator drive shafts.

Fig. 10 is a vertical sectional view taken in the plane indicated by the line 10—10 of Fig. 9. The view shows in elevation the power distribution means shown in Fig. 9.

Fig. 11 is a fragmentary view in plan showing the discharge end of the bridge frame. The view also shows the discharge end of the main conveyor and the control means therefor, together with the crate closing device. A portion of the crate discharge chute is shown.

Fig. 12 is a plan view of the crate discharge chute shown attached to the end of the bridge frame.

Fig. 13 is a side elevation of the discharge chute, showing the method of attachment to the bridge frame.

Fig. 14 is a side elevation of the elevator unit showing its attachment to the bridge frame. Also shown is the means by which each unit is raised relative to the bridge frame. The direction of travel is indicated by the arrows; and the bridge frame is broken away at both sides of the elevator unit so as to shorten the view.

Fig. 15 is an end view of the elevator unit, partly in vertical section.

Fig. 16 is an end elevation of the discharge end of the bridge frame showing the method of its support on the associated tractor. The discharge chute is omitted in this view for clarity, as are the related mechanisms on the bridge frame. A portion of the bridge frame is broken away to reduce its width. The control for the hydraulic means shown in Fig. 5 is here shown diagrammatically. The view also shows in elevation the drive mechanism of one of the tractors.

Fig. 17 is a rear elevation of the discharge end of the bridge frame and the connected tractor.

Fig. 18 is a horizontal sectional view taken in the plane indicated by the line 18—18 of Fig. 17. The view shows the trunnion mounting of the frame and its rotatable interconnection with the associated tractor.

Fig. 19 is a plan view showing details of the tractor drive mechanism.

Fig. 20 is a rear elevation of the bridge frame at the end opposite that shown in Fig. 17. The view shows the means employed for adjustably anchoring this end of the frame to prevent relative movement in a horizontal direction between bridge frame and tractor.

Fig. 21 is a vertical sectional view taken in the plane indicated by the line 21—21 of Fig. 20.

Figs. 3 through 21 are drawn to a scale approximately 1/12 actual size.

In harvesting row crops, particularly lettuce and cabbage, a conventional procedure is to cut the heads away from the stock by hand to prevent injury to the delicate leaves of the heads. To do this, a crop row is straddled by the worker as he advances down the row cutting the heads away and placing the cut heads in the space between the rows. A second group of workers follow in the wake of the cutters and gather the cut heads into crates. The crates are then loaded on trucks and taken to the packing houses where the lettuce or cabbage heads are cleaned and packed. The cleaned and packed heads are then placed in cold storage. From there they are shipped to consumer outlets, such as vegetable brokers and food markets.

This method results in wastage due to bruising of the lettuce heads by multiple handling. Another cause of wastage is the length of time which cut lettuce heads must lie in the field before gathering and packing and storage in coolers. The time element is extended due to the fact that the harvested lettuce must generally be trucked a considerable distance to the packing plant, where, very often, a wait of several hours is necessary before unloading. In the meantime, harvested lettuce is lying in the field waiting to be picked up.

My mobile harvesting and packing apparatus reduces to a minimum the time lapse between cutting the lettuce heads and their storage. At the same time, it reduces to a minimum the handling of the individual lettuce heads, and eliminates contact of the lettuce heads with the ground. Within minutes after the heads are severed from the stalks, they are cleaned, packed in crates, the crates closed and on their way to cold storage. Experience has proven that under usual working conditions with my machine, a head of lettuce cut at a specific time is placed in cold storage within one hour. By use of my machine, faster harvesting is possible due to much faster processing. The pace of my machine can be adjusted to the pace of the workers.

Lettuce and cabbage are very susceptible to heat; and it has been necessary to commence harvesting during the cool early hours of the morning. Operations cease about 10 a. m. when the temperature starts to rise. Thus, only a relatively short period of each day can be utilized for harvesting in the conventional way. The nature of my machine and its operation makes it possible to harvest all night, thus extending the length of uninterrupted operation and reducing the number of calendar days required to finish a particular field.

This is important because it makes possible harvesting of lettuce immediately upon reaching its peak or prime condition. Too much delay results in the lettuce going to seed and becoming unfit for table use; the resultant of which is a financial loss to the grower which is often disastrous.

Broadly considered, the mobile harvesting and packing apparatus of my invention comprises a substantially rectangular bridge frame supported at each end in an elevated position on appropriately geared-down tractor means. The bridge frame is provided with a floor, through which at intervals extend a plurality of elevator units.

Each of the elevator units extends downwardly to a point just above the level of the crop which will be assumed to be lettuce. In this position, each elevator receives the harvested heads from the attending cutters on the ground and delivers them to the packer on the bridge frame floor beside the elevator.

The lettuce heads as they are removed from the elevator, are packed in empty crates supplied to the packer by a mechanical crate loader. The packed crates are placed by the packer on a conveyor running to a closing station where lids are nailed on the crates. At this point the packed crates are discharged through an appropriately placed chute onto a truck bed. When the truck has been loaded, the packed crates are taken to cold storage for later distribution. The use of my machine permits a production of 320 crates or one railroad carload per hour.

For maneuverability in the field, and to provide a stable support for the bridge frame, each tractor is provided with a pedestal to support an end of the bridge frame in an elevated position. Means are provided for allowing universal movement of each tractor with respect to the associated end of the bridge frame.

Power means are also provided on the bridge frame for driving the conveyor, elevator units, mechanical crate loader and the crate closing means.

To simplify description of the apparatus and its operation, the right side of Fig. 1 will be referred to as the loading end because it is at this end that empty crates enter the machine. The left end of Fig. 1A will be referred to as the discharge end, since there the packed crates leave the machine. Also, the near edge of Figs. 1 and 1A will be referred to as the leading edge; while the far edge will be referred to as the trailing edge. It will be understood that when the machine has advanced to the end of a group of parallel rows, and is moved laterally with respect to the rows to cover the next succeeding group of rows, the leading and trailing edges are reversed.

In greater detail then, and with reference first to Figs. 1 and 1A, the mobile harvesting and packing apparatus of my invention advances broadside down the crop rows in the direction indicated by the arrows to the right and left of Figs. 1 and 1A respectively.

As shown in Figs. 1 and 1A, the machine comprises a substantially rectangular box-like bridge frame. Each of the leading and trailing sides of the frame are formed by long angle-iron stringers 2 and 3, separated vertically to give depth to the bridge frame, and held in position and strengthened by angle-iron truss bracing 4 extending therebetween.

At their ends the leading and trailing sides are joined at substantially right angles by vertically spaced end stringers 6 and 7, also provided with truss bracing. Floor boards 8, extending between the stringers 3 and 7, provide a working surface within the bridge frame. A roof 9, shown best in Fig. 7, of corrugated sheets arranged on a framework of wooden rafters 11, and supported by laterally spaced stud rods 12 interposed between the stringers 2 and the rafters, provides shade and protection from the elements.

Before explaining in further detail the bridge frame and its related mechanisms, it should be explained that the bridge frame in its entirety is supported well above the ground surface of the field over which it operates.

A convenient height is eighty inches, which allows sufficient head room for the men to work under it without danger. To support the bridge frame structure above the ground, and to provide mobility and extreme maneuverability in the field, automotive means in the form of a pair of geared-down tractors is provided. Figs. 1, 1A, 16 and 17 show this construction.

Each of the tractors is arranged so as to support one end of the bridge frame; and is provided with a pedestal type framework 13, preferably of angle-iron, which is interposed between the frame 14 of the tractor and a circular, horizontally positioned bearing plate 16, fixed as by welding to the top of the framework. Centrally fixed in the bearing plate 16 is an upwardly extending stub shaft 17 (Fig. 8), having a groove 18 adjacent its upper end. The stub shaft provides a swivel connection between the plate 16 and a second apertured bearing plate 19 overlying the first plate 16. A bifurcated key 21, engaged in the groove and bolted to the plate 19, retains the two plates in rotatably parallel relation.

To pivotally support the bridge frame on the upper bearing plate 19, the plate is provided with upwardly extending trunnion bearings 22 integrally fixed thereto. The trunnion bearings form a journal for the heavy trunnion pin 23 which passes through the large diameter bearing stud 24, integral with and depending from the carriage plate 26.

The carriage plate 26, as shown best in Fig. 16, is about two feet square and is provided with heavy rollers 27, running in the inwardly opening spaced channel bars 28. The channel bars are arranged to run londitudinally of the bridge frame, being welded at one end to the stringer 7, and at their other end to a cross brace 29, shown in Fig. 20. The cross brace also acts as a stop for the carriage plate. Intermediate their ends, the channels are preferably supported against flexure by a truss beam 31, shown best in Figs. 16, 17, 20 and 21.

While Figs. 16 and 17 show details of the support means at the discharge end of the machine, and Figs. 20 and 21 show corresponding details at the loading end, the cross brace 29 and truss beam 31 are typical of both ends.

Notwithstanding the similarity of the support means at each end of the bridge frame, there are important differences which should be noted. It will be apparent from a comparison of Figs. 17 and 20, both of which are rear elevations, that the carriage plate 32 in Fig. 20 is adapted to slide in the longitudinally extending slideway 33. Movement of the carriage plate 32 is controlled by anchoring the plate to the stringer 7 by a threaded spindle 34 working against plate bracket 36 welded to stringer 7, and provided with a handle 37. The spindle threads into one end of a bifurcated link 38, the opposite end of which is pivotally connected to the carriage plate lug 39 by the pin. 41.

As will be seen, rotation of the spindle exerts tension or thrust on the link, causing the slideway to move relative to the plate. Since the carriage plate 26 at the opposite or discharge end of the machine is equipped with rollers, the entire bridge assembly adjusts itself with relation to the tractors. This adjusting means is particularly useful when the machine is being prepared for operation in a new field and it becomes necessary to line up the bridge frame and its related mechanisms with the crop rows. In this respect, the tractor supporting the loading end of the machine can be called the guide tractor, since movement of this tractor transversely of the crop rows will effect transposition of the bridge frame also. The tractor at the other or discharge end meanwhile continues along the rows while the bridge frame shifts to a newly adjusted position on it.

A flexible interconnection between the bridge frame and the two tractors is also advantageous when the machine has reached the end of a group of rows, and it is desired to move over to the next succeeding group of rows. At this time, both tractors execute a 90° turn so that they travel in tandem relation. The bridge frame does not turn, it remains in the same position with relation to the rows. When the lead tractor has advanced sufficiently to place the bridge frame over a new group of rows, both tractors again execute a 90° turn so as to head back down the rows. Assuming that in coming down the field, that is, toward the observer, the near side in Figs. 1 and 1A is the leading side, then, in going back up the field, or away from the observer, the opposite side becomes the leading side.

The mechanisms carried by the bridge frame will now be described.

The floor 8 of the bridge frame covers the entire area of the bridge frame, from end to end, and from leading edge to trailing edge.

Adjacent the leading and trailing edges, and within the confines of the stringers 3, the floor is provided with a series of spaced apertures 42, each of which provides for the passage of an elevator unit 43.

As shown diagrammatically in Figs. 1 and 1A, there are eight elevator units spaced in pairs along the length of the bridge frame. One elevator unit of each pair is positioned adjacent one edge of the bridge frame while the other elevator unit of the same pair is offset somewhat and positioned adjacent the opposite edge.

This offset or staggered relation of elevator units within the same pair is important since, in lettuce fields, crop rows are generally spaced 38" apart, and staggering the elevators of each pair an equal amount places the elevators over adjacent crop rows.

In operation, two cutters are assigned to each elevator, one on either side. Since each elevator is positioned over a crop row, each cutter cuts lettuce from the row immediately adjacent the row being passed over by the elevator unit he is attending.

The passed over row is simultaneously being harvested by one cutter of a pair assigned to the offset and trailing elevator unit. In this way, each pair of elevators receives the lettuce from four adjacent crop rows so that collectively, the eight elevator units on the bridge frame receive the crop from sixteen rows. To do this efficiently, corresponding elevators of adjacent pairs are spaced lengthwise of the bridge frame a distance equal to the space between five crop rows.

The detail construction of the elevators, together with the driving means of each, is best shown in Figs. 6, 14 and 15.

Each elevator unit comprises a pair of horizontally spaced parallel drive sprockets 46, fixed on a common shaft 47 extending crosswise of the bridge frame. The ends of the shaft are journaled adjacent the upper ends of horizontally spaced and vertically extending elevator frame members 48.

These members extend downwardly through the apertures 42, terminating at a point spaced a short distance above the ground. The lower ends of the elevator frame members are provided with take-up journal bearings 49, in which is journaled the shaft 51, carrying sprockets 52, corresponding in spacing and in size with the sprockets 46. Endless chains 53, connecting corresponding sprockets of each pair, provide a mounting for pivotally suspended elevator buckets 54 extending between the chains. There are conveniently about thirteen buckets in each elevator unit, equally spaced on the chains about nineteen inches apart.

The buckets extend between parallel reaches of the spaced chains, and are provided with upwardly extending end plates 56, to the upper portion of each of which is fixed a pivot pin 57 pivotally engaging the adjacent chain. The bottom of each bucket is concave, and preferably integral with the lower ends of the end plates 56. The offset pivotal mounting thus insures that each bucket will remain in an upright position during movement around the sprockets. This feature is important since it permits the buckets to make a complete revolution without spilling the contents.

The buckets are further stabilized in their travel by channel guides 59 opening toward the buckets and fitting closely over each reach of the chain. Cross bars 61, welded to the channels and to the intermediately positioned frame members 48, retain the channels in position.

Due to the nature of the terrain in which the machine is to work, means are provided for raising each elevator unit bodily to clear obstructions on the ground, such as fence posts and irrigation stand-pipes.

To accomplish this, a long slide bearing 62, Figs. 14 and 15, adapted to engage one of the vertical elevator frame members 48 is fixed to the bridge frame. The slide bearing is preferably a box-section fitting closely around the frame member 48 for a considerable portion of its length, and is fixed, as by brackets 63 and bolts 64, to the vertically spaced and horizontally extending stringers 2 and 3. An adjustable collar 66, tightly clamped to the frame member 48, limits downward movement of the elevator unit.

Each elevator unit is raised by cable 67, anchored at one end to the sliding frame member 48, and at the other end secured to a clevis 68, carried on the piston rod 69 of a hydraulic cylinder 71, shown best in Fig. 5. There are conveniently two such hydraulic cylinders, each controlling four elevator units. Each cylinder is secured to diagonally opposed corners of the bridge frame. A bracket 72 welded to the lower stringer 3, and a pin 73 passing through the bracket and the shank 74 at the base of the cylinder, retain the unit securely in place when hydraulic pressure is applied through the pressure hose 76.

Each tractor driver has control of one hydraulic cylinder. By visual observation, each driver determines when and how high to raise his four elevators. Operation of the elevators need not be stopped during their vertical adjustment.

The drive mechanism for the elevator units is best shown in Figs. 1, 1A, 6, 9 and 10. A power unit 81, such as an internal combustion engine, is mounted on the floor of the bridge frame adjacent the loading end. A pulley 82 on the main drive shaft 83 of the power unit drives a pulley 84 on gear reduction unit 86. The gear reduction, through pulleys 87 and 88 thereon, drive pulleys 89 and 91, each fixed respectively on elevator drive shaft extensions 92 and 93.

Shaft extension 92 is journaled in bearings 94 and 96 on the bridge frame adjacent its edge. The inner end of shaft 92 is universally connected, through the intermediate shaft 98, with a main elevator power shaft 99, journaled in bearings 101, and extending along the bridge frame toward the discharge end thereof, and terminating in a power distribution mechanism midway between the second and third elevator units.

The power distribution mechanism, shown best in Figs. 9 and 10, comprises a sprocket 102, driven by the main power shaft 99; and, by means of a chain 103, drives sprocket 104 fixed to stub shaft 106 journaled on spaced uprights 107. The outer end of main power shaft 99 is also journaled on uprights 107.

From stub shaft 106, power is distributed to the elevator units on either side by means of auxiliary elevator drive shafts 108 and 109. Each of these shafts is universally connected at one end to the stub shaft 106. At its other end, each shaft is universally connected to elevator stub shaft 112 journaled on horizontally spaced support members 113. The stub shafts 112 are each provided with a bevel gear 114 fixed thereon and meshing with a bevel gear 115, fixed on the drive shaft 47 of the adjacent elevator unit.

From stub shafts 112, power is transmitted to the next succeeding elevator units by means of similar universally connected auxiliary shafts. Each of the auxiliary shafts is preferably a telescoping unit as shown, capable of lengthwise adjustment. This is important in lending flexibility to the structure when the elevators are raised.

The elevator units adjacent the opposite edge of the bridge frame take their power from the elevator drive shaft extension 93, driven by pulley 91 fixed thereon. Connection of this shaft to its own distribution mechanism, auxiliary elevator drive shafts, and stub shafts adjacent each of the elevators, is accomplished in the same manner as explained for the trailing elevators. These details are not shown in the drawings, and explanation would be repetitious.

As the machine travels across a lettuce field, the two cutters for each elevator walk along, cutting the lettuce heads and placing them in the elevator buckets. These are carried upwardly through the aperture 42 in the floor, where the lettuce is removed by a packer and packed into crates.

One packer attends at each elevator unit; and each packing station is supplied with empty crates by a longitudinally extending conveyor 121, positioned centrally of the bridge frame. As shown in Figs. 6 and 7, the conveyor 121 is elevated above the floor of the bridge frame; and comprises a pair of parallel channels 122, equipped with spaced rollers 123 journaled therealong.

At its forward end, shown in Figs. 3 and 4, a section of the conveyor is inclined and extends between stringer 6 and a horizontal cross bar 126 fixed between a pair of spaced and vertically extending support columns 127, connected at their top ends to the roof framework, and at their bottom ends fixed to transversely inclined brace bars 128. Corresponding ends of each of the brace bars are removably secured to stringers 2 of the bridge frame, and to a bar 129 secured to the floor.

Preferably, there are at least four such supporting columns and brace bars spaced along the length of the conveyor, which ends just past the last elevator unit. Guide rods 130, welded to the support columns, retain the crates thereon until they are lifted off by the packers.

To insure that empty crates on the horizontal portion of the conveyor do not roll down the inclined portion, stop means are provided at their juncture. As shown in Figs. 7 and 8, the stop means comprises a strap 131 provided with a counterbalance 132 at one end, and bent at the other end to provide a vertical face 133 against which a crate will abut. Lugs 134, fixed on the cross bar 126, and a pin 136 therethrough, provide a pivotal mounting for the stop means. Thus, when a crate is propelled to the right as viewed in Fig. 8, the face end of the stop is depressed by the crate. As soon as the crate has passed, the counterbalance acts to replace the stop in effective position.

In order to maintain the empty crate conveyor full of crates, a mechanical crate loader is provided. As shown in Figs. 3 and 4, the crate loader comprises a section of conveyor having rollers 141 journaled in spaced channels 142. This conveyor is positioned so as to be substantially a continuation of the inclined portion of conveyor 121, and projects from the end of the bridge frame in cantilever fashion.

To support the crate loading mechanism in this position, the upper end of the channels are connected by a cross bar 143, from the center of which depends a length of pipe 144, abutting at its lower end a bearing bracket 146. A second bearing bracket 147, is welded to the stringer 6, and both are apertured to receive the headed pin 148, passing through both bearing brackets and the pipe 144. Brace rods 149 extending between the lower end of the pipe 144 and the outer portions of channels 142 support and lend rigidity to the structure. The pipe and cross bar 143 are preferably integral, and being journaled between the two bearing brackets by the pin, provide a convenient means for pivotally mounting the crate loader for side to side swinging movement. Springs 151 on either side of the structure, resiliently connecting the channels 142 to the bridge frame, function to reestablish alignment of the crate loading conveyor with conveyor 121, when the former is swung in either direction to avoid an obstacle.

Means are provided on the crate loader for mechanically impelling a train of empty crates to maintain the empty crate conveyor full at all times.

Parallel to the channels 142 and welded thereto, are spaced guide rails 156. Sleeves 157, each slidable on a guide rail, are connected by a bearing tube 158 extending transversely over the channels. Journaled in and projecting from each end of the bearing tube is a rod 159, each end of which, at a point spaced from the end of the tube, is bent at right angles to form connecting links 161, the extreme ends of which are journaled in the outer bearing ends 162 of two crank arms 163.

At their inner ends, the two crank arms are fixed to opposite ends of the shaft 164, journaled in bearings 166, fixed adjacent the top ends of bearing support columns 167 extending upwardly in spaced relation on either side of the channels 142 and preferably welded thereto.

A sprocket 168 fixed on the shaft 164, is driven by a chain 169, from a sprocket 171 fixed on one end of shaft 172, which in turn is journaled on the channels 142 in bearings 173. The other end of the shaft is provided with a universal joint 174, which forms a flexible connection between the shaft 172 and drive shaft 176. A second universal joint 177 on the opposite end of drive shaft 176 connects the loading mechanism through bevel gears 178 and 179, to the elevator drive shaft 92. For complete flexibility, and to provide for variations in length, the drive shaft 176 is of two-part telescoping construction as shown.

Thus when the elevator units are being driven by shafts 92 and 93, as in normal operations, the drive shaft 176 is also being driven and the loading mechanism is operating.

In the operation of the empty crate loader, the shaft 172, through sprockets 168 and 171, drives the shaft 164 with the crank arms thereon. Rotation of the crank arms, with connecting links 161 pivotally attached thereto, cause sliding movement of the sleeves 157 on the guide rails 156, thus carrying the sleeves and the attached bearing rod 158 to the lower end of the crate loader. When the parts are in this position, an empty crate is placed on the conveyor in front of (to the left in Fig. 3) the bearing tube. Further rotation of the crank arms effects forward movement of the bearing tube and sleeves, thus propelling the empty crate upward or to the left in Fig. 3. The empty crate being propelled upward will abut the crates that have been loaded before it, and the entire train will be pushed forward the length of one crate.

To prevent the last crate loaded from rolling back down the inclined loading conveyor when the sleeves and bearing tube move back to receive another crate, means are provided on the conveyor channels 142.

Such means comprises a pair of lugs 181, pivoted on the channels by pins 182. Each of the lugs extends upwardly to a point just above the level of the conveyor rollers, and is provided at its upper end with a rounded corner 183. The lower ends of the lugs project below the channels and are connected to each other by a cross rod 184. The greater length of the downwardly projecting portion of the lug and the rod, act as a counterbalance tending to retain the lugs in the position shown in Fig. 4. When a crate is propelled to the left, however, the rounded corners 183 are engaged by the crate and the lugs depressed. They are held depressed until the crate passes beyond them, at which time the counterbalanced lower ends cause the lugs to pivot into an upright position as shown. The lugs are stopped in this position by stop blocks 186. The bearing tube passes over the lugs and continues to the extremity of its cycle, where another crate is placed before the bearing tube. The empty crates are taken from a truck which follows along with the machine.

As the packers fill the empty crates, they must be rapidly disposed of. To handle the filled crates, a power operated belt conveyor is provided.

This conveyor is parallel to and positioned below the straight section of the upper empty crate conveyor 121. Its forward end is supported on a horizontal cross bar 191, which is spaced a short distance above the floor of the bridge frame and welded to the rear side of the vertical support columns 127, and the inclined transversely extending brace bars 128, as shown in Figs. 1, 6 and 7. Horizontal cross bars welded to each of the support columns spaced along the conveyor, support the conveyor at intervals.

The belt conveyor comprises longitudinally extending and horizontally spaced channels 192, connected at closely spaced intervals by journaled rollers 193. The rollers serve to support the upper reach of a continuous belt 194, which is driven by a drum pulley 196. The drum pulley is fixed on drive shaft 197, supported on the horizontal cross bar 191 by forwardly extending bracket arms 198, on which are mounted bearings 199 in which the shaft is journaled. The lower reach of the belt is supported on widely spaced rollers 201 which are journaled on straps 202 fixed to the channels 192 and extend downwardly therefrom. As shown in Fig. 7, the belt is passed under the first roller and then over the next succeeding rollers. If desired this first roller may act as a belt tightener; however, it is preferable to provide the discharge end of the belt conveyor (Figs. 1A and 11) with a drum pulley 203, journaled in adjustable take-up bearings 204. The discharge end of the belt conveyor is supported above the floor by an angle-iron framework 206, fixed to one of the truss braces 31 extending across the bridge frame.

From the belt conveyor, the filled crates pass onto a removable and relatively short section of conveyor having rollers 207 journaled in parallel channels 208. One end of the short conveyor is supported on the framework 206, while the other end is supported on the framework 209, which also supports a plate 212 having universal castors 213 mounted thereon and over which the crates roll.

After passing over the universal castors, the filled crates pass onto the rollers 214 journaled in channels 216, which form a short section of conveyor extending between the framework 209 and the receiving end of a nailing machine 217. It is while each filled crate is supported on this section of conveyor that the crate lid is placed in nailing position. With the lid in place, the crate is propelled into the nailing machine by the operator and the lid nailed tight.

From the nailing machine, the crate emerges in condition to be trucked to cold storage. A conveyor having channels 218, and rollers 219 journaled thereon, is supported at one end on the nailing machine, and at the other end on the stringer 6 across the discharge end of the machine.

A downwardly inclined chute having a bottom 221, side guide rails 222 and top guide channels 223, is pivotally mounted on the discharge end of the bridge frame in extension of the conveyor 218—219. The chute is pivotally mounted by a substantially vertical pin 224 journaled in bearings 226 and 227 fixed to the stringers 6 and 7 respectively. An angle-iron brace bar 228, connects the upper ends of channels 229 to the upper portion of pin 224. Adjustable collars 231 on the pin, bear against the bearings 226 and 227, and provide for adjustment of the chute up or down. Longitudinally extending braces 232, welded at one end to the lower end of the pin and at the other end to the channels, serve to lend rigidity to the chute structure. At its extreme outer end, the chute is provided with a substantially horizontal section 233 which forms a platform on which the crates come to rest. A worker standing on the bed of a truck positioned under the chute, receives the crate and stacks it with others on the truck. Springs 234, attached to each side of the chute and to the bridge frame, allow swinging movement of the chute to clear obstructions, such as the cab of the truck, and realignment of the chute with conveyor 218—219.

To control and drive the belt conveyor, shown in Figs. 6 and 7, the forward drive shaft 197 is equipped with a normally engaged spring pressed clutch 241. The clutch is fixed on one end of the stub shaft 242, journaled in bearing 243 and provided at its other end with a bevel gear 244, in mesh with bevel gear 246. Bevel gear 246 is fixed on the stub shaft 247, which is journaled in spaced bearings 248 and 249. Bearings 243 and 249 are supported at right angles to each other on the framework 251, projecting forwardly from and fixed on the horizontal cross bar 191 supporting the forward end of the belt conveyor.

The stub shaft 247 is connected with and driven by the long drive shaft 252, extending forwardly and driven in turn by the gear reduction 86, through a chain sprocket 253 thereon, and a sprocket 254 fixed on stub shaft 256. The stub shaft 256 is raised above the floor of the bridge frame and journaled in bearings 257 fixed to spaced and vertical support bars 258 anchored to the floor.

Control means are provided for optionally engaging or disengaging the clutch 241 to activate or deactivate the belt conveyor. A control lever 261, pivotally mounted on the cross bar 191 operatively engages throw-out collar 264 of the clutch which is slidable on the shaft 242. A spring 266 retains the clutch in normally engaged position. Tension applied to the cable 267 connected to the lever 261, effects disengagement of the clutch.

The cable 267 passes over a pulley 268 fixed to one of the channels 192, and terminates adjacent the discharge end of the conveyor (Fig. 4) and is connected to a lever 269 pivoted on the framework 206. Thus, any one of the men working in the vicinity of the discharge end of the conveyor may stop the conveyor at will.

Referring now to Fig. 2 wherein are shown diagrammatically the hydraulic and compressed air drive and control systems.

Fixed on the main power shaft 83 of the power unit is a pulley 271. By means of a belt, the pulley 271 drives a pulley 272 on air compressor 273. The delivery side of the compressor is connected by hose 274 to the storage tank 276, secured to the floor in one corner of the bridge frame.

Means are provided for enabling the nailing machine operator to stop operation of all mechanism on the bridge frame, if anything goes wrong on the bridge frame. From the air storage tank, air under pressure is piped, through the pipe 277, to a control valve 278 fixed on the side of the nailing machine within easy reach of the nailing machine operator. A return air line 279, delivers air from the valve to a booster unit 281, arranged so as to disengage the friction clutch 282 interposed in the main drive shaft 83 in advance of the pulleys 82 and 271. By manipulation of the valve 278, the power unit 81 is completely disconnected from all other mechanisms, so that everything on the bridge frame comes to a standstill.

Connecting with the pipe 277 is a short feeder pipe 283, which delivers air under pressure to a second air storage tank 284, secured to the floor boards in the vicinity of the discharge end of the belt conveyor. Air from the tank 284 operates a carton closing machine 286 and an air operated stapling gun 287, which will be later explained.

To supply hydraulic fluid under pressure to drive the nailing machine 217, a hydraulic pump 291 is provided. The pump is connected, through the flexible coupling 292, with the main power shaft 83 of the power unit.

To supply the pump with hydraulic fluid, a reservoir tank 293 is connected thereto by flexible hose 294. The delivery side of the hydraulic pump is provided with a short pipe extension 296 from which flexible hydraulic hoses 297 and 298 lead off. Hose 297 is connected, through normally closed valve 299, with the hydraulic reservoir, and serves to return the fluid to the reservoir directly from the pump. This valve can also be adjusted so as to by-pass a portion of the fluid to reduce the pressure in hose 298.

Hose 298 discharges into the distribution valve 301, connected on one side to the pressure pipe 302 leading to the pressure side of the hydraulic motor 303 on the nailing machine. By-pass hose 304, having relief valve 306 interposed therein, connects the pressure line with the fluid return hose 307, which connects with pipe 308 for return of the fluid to the distribution valve 301. From the distribution valve, the fluid is carried by hose 309 to the reservoir 293 for reuse. An overflow pipe 312, preferably of copper tubing, connects the hydraulic motor on the nailing machine with the reservoir.

Occasionally it is desirable to pack the lettuce crop in cardboard cartons instead of wooden crates.

When cardboard cartons are used, the operation is altered so as to eliminate the mechanical crate loader and nailing machine. Cardboard shook is loaded directly on the bridge frame in the vicinity of a hydraulic stitching machine 313, shown in Fig. 1, and is connected by flexible hose 314 and valve 316 with hose 298. Return line 317 and overflow line 318 connect the stitcher motor with the tank 293. The operator of the stitching machine folds the shook into box form, stitching as necessary, and then places the cartons on the upper conveyor 122—123, from which they are removed by the packers as needed.

The filled cartons are placed on the belt conveyor 194 and pass through the air operated carton closing machine 286, which is substituted in place of the short removable conveyor 207—208. From the carton closing machine, the cartons pass onto the castored plate 212, where they are stapled shut by a worker using the air operated stapling gun 287. The closed cartons now pass over the short conveyor 214—216, across the operating station of the nailing machine, and down the discharge chute to the truck.

Due to the character of the work, the forward speed of the apparatus must be capable of adjustment. It must also be able to travel very slowly, even as little as ten feet a minute, so that a balance is reached between the quantity of lettuce cut by the men on the ground and the quantity handled by the packers on the bridge frame.

To accomplish this, Figs. 16, 17 and 19, each of the two tractors is modified so as to provide dual rear wheels 321 arranged in tandem, and driven by axle extensions 322 terminating in the differential 323, which is driven from a double transmission in the housing 324 shown in Fig. 17. Such double transmissions are commonly used to secure a large number of speed increments and need not be shown or explained in detail here.

As shown in Fig. 17, the axle housing 325 is supported directly on and fixed to the tractor frame 14. A spacing block 326, interposed between the axle housing and the beam 327 supporting the pedestal framework 13, provides space for the seat 328, Fig. 16, for the tractor operator. Heavy bolts 329, passing on each side of the axle housing and secured to the frame 14 and the beam 327, retain the parts rigidly together.

The axle extension 322 on each side of the tractor is journaled in bearing brackets 331 fixed to spaced channel frame members 332. The frame members 332, together with end channels 333, enclose and provide a bearing on which are journaled the two tandem wheels on each side of the tractor.

To drive the tamdem rear wheels of each tractor, a drive sprocket 334 fixed on each axle extension 322 is provided. Each drive sprocket is linked by a chain 336 to a sprocket 337 fixed on each of the wheels. Intermediate idler sprockets 338 are interposed between the drive sprocket and the wheel sprockets to give sufficient engagement of the chain with the drive sprocket; and adjustment of chain tension is secured by mounting each idler sprocket in a bracket 339 adjustably fixed on one of the channel frame members 332.

Means are provided to resist the inherent tendency of each wheel frame to rotate about the axis of the axle extensions due to the off-center force applied by the chains in driving the tractor.

Each set of wheel frame members 332—333 is provided at each end with a pair of spaced bearing brackets 342 adapted to receive and retain therein the laterally extending end or journal portion 344 of a heavy rod. A sleeve 346 enclosing the journal portion lying between the brackets, together with a bolt 347 passing through both sleeve and journal, retain the journal against lateral movement while permitting rotation.

Transversely extending rod portion 348 acts as a crank arm connecting the journal portion 344 with journal portion 349, which also extends laterally and parallel to portion 344. The portion 349 is journaled on the tractor main frame member 14 by a sleeve bearing 351 bolted thereto.

Thus, it will be seen that elevation of one wheel, as by an obstruction, produces a rotary moment in the frame 332—333 about the axis of the axle extension 322. The force of the moment is transmitted from one end of the wheel frame to the other by a heavy bar 353 pivotally connecting upwardly extending crank arms 354, formed integrally with the journal portion 349 of each rod. A clevis 356 threaded into each end of the bar provides for lengthwise adjustment of the bar. Thus, as one wheel rises over an obstruction, say the forward wheel to the right in Fig. 19, the displacement causes counterclockwise tilting of the wheel frame about the axis of rotation of the rear wheel, tending to retain the rear wheel in contact with the ground. Without the linkage, the rear wheel would tend to rise off the ground due to the torque applied by the chain. Both wheels on each side of each tractor are thus kept in contact with the ground for maximum traction regardless of irregularities in the terrain; and this is true regardless of the direction in which the tractor moves.

Since the spacing of crop rows are not always uniform, means are provided for adjusting the lateral spacing of the rear tractor wheels. This is conveniently accomplished by providing a plurality of apertures 357 in the sleeves 346, Fig. 17. The bolt 347 is withdrawn from the position shown, the wheels shifted in or out as desired, and the bolt reinserted through the aperture which provides the desired spacing of the wheels.

I claim:

1. In a mobile harvesting and packing apparatus, the combination comprising a pair of spaced tractors, a lower bearing plate fixed on each tractor, an upper bearing plate rotatably mounted on each lower bearing plate in a vertical axis, a carriage plate pivotally mounted on each upper bearing plate in a horizontal axis, and a bridge frame extending between the tractors and supported on the carriage plates in elevated relation to the ground.

2. In a mobile harvesting and packing apparatus, the combination comprising a pair of spaced tractors, a lower bearing plate fixed on each tractor, an upper bearing plate rotatably mounted on each lower bearing plate in a vertical axis, a carriage plate pivotally mounted on each upper bearing plate in a horizontal axis, a bridge frame extending between the tractors and supported on the carriage plates in elevated relation to the ground, and a slideway fixed at each end of the bridge frame engaging the associated carriage plate and slidable thereon.

3. In a mobile harvesting and packing apparatus, the combination comprising a pair of spaced tractors, a lower bearing plate fixed on each tractor, an upper bearing plate rotatably mounted on each lower bearing plate in a vertical axis, a carriage plate pivotally mounted on each upper bearing plate in a horizontal axis, a bridge frame extending between the tractors and supported on the carriage plates in elevated relation to the ground, a slideway fixed at each end of the bridge frame engaging the associated carriage plate and slidable thereon, and screw means to adjustably fix the position of one end of the bridge frame to the associated carriage plate.

4. In a mobile harvesting and packing apparatus for conditioning and packing in crates row crops in the field, the combination comprising a pair of spaced independently controllable tractors; a bridge frame extending therebetween in elevated relation to the ground and carried by the tractors; and a plurality of crop receiving and conveying elevator units supported on the bridge frame.

5. The apparatus according to claim 4, wherein the tractors and bridge frame are pivotally connected at one end thereof, and pivotally connected and slidable at the other end.

6. The apparatus according to claim 4, wherein means are provided on the bridge frame to vertically adjust the elevator units with relation thereto.

7. In a mobile harvesting and packing apparatus for conditioning and packing in crates row crops in the field, the combination comprising a pair of spaced tractors; a bridge frame extending therebetween in elevated relation to the ground and carried by the tractors; a plurality of crop receiving and conveying elevator units supported on the bridge frame, each of said elevator units including a vertically extending framework slidably mounted on the bridge frame, a pair of spaced sprockets journaled on the framework at each end thereof, a chain connecting corresponding sprockets of each pair, a plurality of buckets pivotally suspended between the chains; power means on the bridge frame operatively connected to drive the sprockets; and means on the bridge frame for vertically adjusting the elevator units with relation to the bridge frame.

8. In a mobile harvesting and packing apparatus for conditioning and packing in crates row crops in the field, the combination comprising a pair of spaced independently controllable tractors; a bridge frame extending therebetween in elevated relation to the ground and carried by the tractors; a crop conveying elevator unit supported on the bridge frame for conveying the harvested crop from a crop receiving station at crop level to a crop packing station on the bridge frame, conveyor means on the bridge frame adjacent the packing station and extending lengthwise of the bridge frame for conveying the packed crop away from the packing station, said conveyor means acting in time with said elevator unit, crate loading means on the bridge frame for delivering empty crates to the packing station in time with said elevator unit and conveyor means, and power means on the bridge frame for driving the elevator unit, conveyor means and crate loading means.

9. A mobile harvesting and packing apparatus for conditioning and packing in crates row crops in the field, comprising a pair of spaced tractors, a bridge frame extending therebetween in elevated relation to the ground and carried by the tractors, conveyor means on the bridge frame for conveying packed crates from a packing station to one end of the bridge frame, an empty crate slideway above said conveyor means for receiving and retaining empty crates to be packed, and crate loading means on the bridge frame for supplying said slideway with empty crates.

10. In a mobile harvesting and packing apparatus, the combination comprising a pair of independently controllable tractors laterally spaced apart and selectively maneuverable between a minimum and a maximum lateral spacing, a bridge frame extending between and above said tractors and mounted to swivel on each, and a carriage plate interposed between each tractor and the bridge frame to effect adjustment of the bridge frame on the tractors when the tractors are maneuvered relative thereto.

11. In a mobile harvesting and packing apparatus, the combination comprising a pair of independently controllable tractors laterally spaced apart and selectively maneuverable between a minimum and a maximum lateral spacing, a bridge frame extending between and above said tractors and mounted to swivel on each, a carriage plate interposed between each tractor and the bridge frame to effect adjustment of the bridge frame on the tractors when the tractors are maneuvered relative thereto, and means locking one of said tractors and the associated carriage plate to the bridge frame so that lateral maneuvering of said tractor effects corresponding lateral movement of the bridge frame relative to the other tractor.

12. In a mobile harvesting and packing apparatus, the combination comprising a pair of independently controllable tractors laterally spaced apart and selectively maneuverable between a minimum and a maximum lateral spacing, a bridge frame extending between and above said tractors and mounted to swivel on each, a carriage plate interposed between each tractor and the bridge frame to effect adjustment of the bridge frame on the tractors when the tractors are maneuvered relative thereto, and a plurality of crop receiving and conveying elevator units supported on the bridge frame within the space determined by said minimum lateral spacing of the tractors.

13. In a mobile harvesting and packing apparatus, the combination comprising a pair of independently controllable tractors laterally spaced apart and selectively maneuverable between a minimum and a maximum lateral spacing, a bridge frame extending between and above said tractors and mounted to swivel on each, a carriage plate interposed between each tractor and the bridge frame to effect adjustment of the bridge frame on the tractors when the tractors are maneuvered relative thereto, a plurality of crop receiving and conveying elevator units supported on the bridge frame within the space determined by said minimum lateral spacing of the tractors, and means on the bridge frame to vertically adjust the elevator units with relation thereto.

14. In a mobile harvesting and packing apparatus for conditioning and packing in crates row crops in the field, the combination comprising a pair of spaced independently controllable tractors each having a frame; and a bridge frame extending therebetween in elevated relation and mounted to swivel on each; each said tractor comprising two pairs of traction wheels arranged in tandem relation, drive axle means common to corresponding wheels of each pair for driving said wheels, a wheel frame enclosing corresponding wheels of each pair, and means pivotally mounting each said wheel frame on the tractor frame.

References Cited in the file of this patent

UNITED STATES PATENTS

| | | |
|---|---|---|
| 1,095,127 | Senderling | Apr. 28, 1914 |
| 1,733,356 | Mossay | Oct. 29, 1929 |
| 2,321,387 | Jackson | June 8, 1943 |
| 2,473,587 | Huston | June 21, 1949 |
| 2,615,586 | Miller et al. | Oct. 28, 1952 |
| 2,717,707 | Martin | Sept. 13, 1955 |

FOREIGN PATENTS

| | | |
|---|---|---|
| 451,813 | Great Britain | Aug. 12, 1936 |